(12) United States Patent
Higashino et al.

(10) Patent No.: US 7,506,893 B2
(45) Date of Patent: Mar. 24, 2009

(54) IMPACT ABSORBING STEERING COLUMN DEVICE FOR VEHICLE

(75) Inventors: Kiyoharu Higashino, Gunma-ken (JP); Kiyoshi Sadakata, Gunma-ken (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 202 days.

(21) Appl. No.: 10/559,275

(22) PCT Filed: Apr. 28, 2004

(86) PCT No.: PCT/JP2004/006122

§ 371 (c)(1),
(2), (4) Date: Dec. 2, 2005

(87) PCT Pub. No.: WO2004/108502

PCT Pub. Date: Dec. 16, 2004

(65) Prior Publication Data

US 2006/0125224 A1    Jun. 15, 2006

(30) Foreign Application Priority Data

Jun. 3, 2003   (JP)   ............... 2003-158317

(51) Int. Cl.
*B62D 15/02* (2006.01)
(52) U.S. Cl. ...................... 280/776; 280/777
(58) Field of Classification Search ................ 280/775, 280/776, 777, 779
See application file for complete search history.

(56) References Cited

U.S. PATENT DOCUMENTS

| | | | | |
|---|---|---|---|---|
| 3,788,148 A | * | 1/1974 | Connell et al. | ................. 74/492 |
| 5,476,284 A | * | 12/1995 | DuRocher et al. | ........... 280/777 |
| 5,590,565 A | * | 1/1997 | Palfenier et al. | ............... 74/493 |
| 5,722,300 A | * | 3/1998 | Burkhard et al. | .............. 74/493 |
| 5,758,545 A | * | 6/1998 | Fevre et al. | .................... 74/493 |
| 5,870,930 A | * | 2/1999 | Willett et al. | .................. 74/492 |
| 5,984,354 A | * | 11/1999 | Kim | ........................... 280/777 |
| 6,971,676 B2 | * | 12/2005 | Lange et al. | ................. 280/777 |
| 7,168,741 B2 | * | 1/2007 | Kinme et al. | ................ 280/777 |
| 7,178,833 B2 | * | 2/2007 | Cymbal et al. | .............. 280/777 |
| 2002/0088296 A1 | | 7/2002 | Schroter et al. | |

FOREIGN PATENT DOCUMENTS

| | | |
|---|---|---|
| DE | 16 05 963 A1 | 12/1970 |
| DE | 85 34 668 U1 | 2/1986 |
| EP | 0 936 130 A | 8/1999 |
| EP | 1 223 363 A | 7/2002 |
| EP | 1 234 745 A1 | 8/2002 |
| FR | 1 560 116 A | 3/1969 |

(Continued)

*Primary Examiner*—Toan C To
(74) *Attorney, Agent, or Firm*—Miles & Stockbridge P.C.

(57) ABSTRACT

In an impact absorbing type steering column apparatus for a vehicle in which two columns are fitted to each other in such a manner that an upper column, while being moved to the front part of the vehicle with respect to a lower column, absorbs the impact energy at a secondary collision of the vehicle, a bush is fixedly fitted to at least one of the outer peripheral side of the upper column and the inner peripheral side of the lower column in the fitting portion between the two columns.

8 Claims, 8 Drawing Sheets

FOREIGN PATENT DOCUMENTS

| | | |
|---|---|---|
| FR | 2 781 749 A1 | 2/2000 |
| GB | 1117537 | 6/1968 |
| GB | 1148469 | 4/1969 |
| GB | 2 184 213 A | 6/1987 |
| JP | UM 1-172965 U | 12/1989 |
| JP | UM 5-60982 U | 8/1993 |
| JP | 7-76279 A | 3/1995 |
| JP | 7-117687 A | 5/1995 |
| JP | 8-142877 A | 6/1996 |
| JP | 9-48353 A | 2/1997 |
| JP | 10-53144 A | 2/1998 |
| JP | 2000-219139 A | 8/2000 |
| JP | 2002-302048 A | 10/2002 |

* cited by examiner

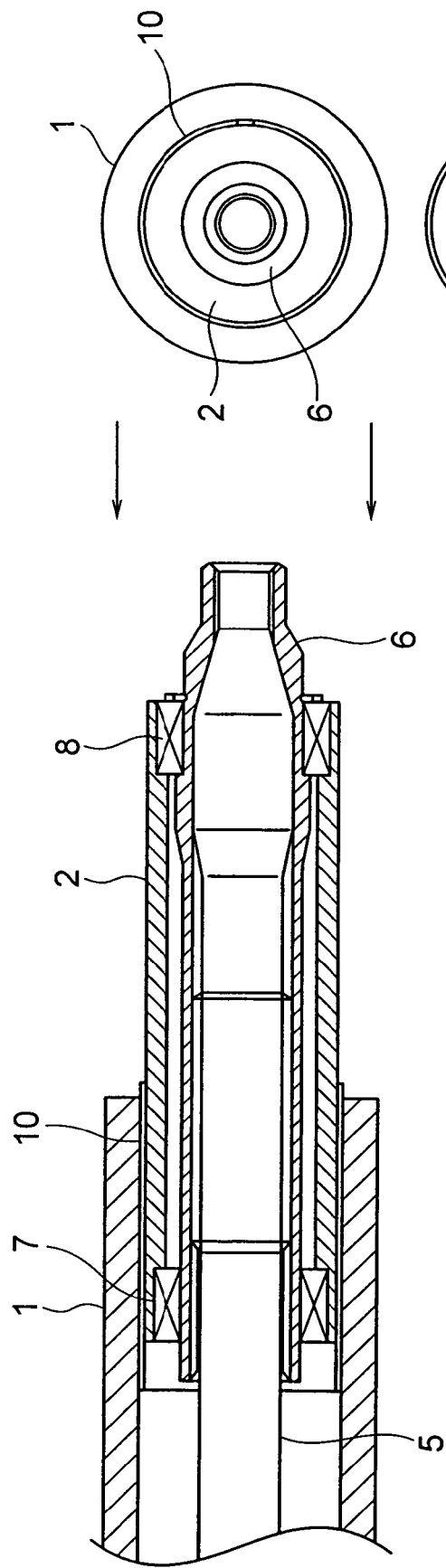
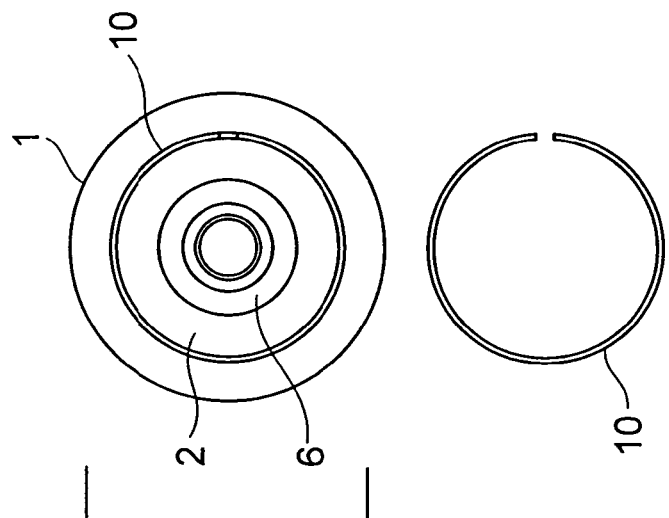
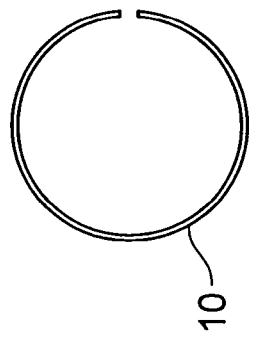

IMPACT ABSORBING STEERING COLUMN DEVICE FOR VEHICLE

TECHNICAL FIELD

The present invention relates to an impact absorbing type steering apparatus of a double tube scheme for a vehicle for absorbing, at a secondary collision, the impact energy thereof.

BACKGROUND ART

When an vehicle collides with other vehicle or a structure, etc., the driver might suffer a secondary collision with a steering wheel by its inertia. The vehicles manufactured over the recent years broadly employ an impact absorbing type steering column apparatus, together with a safety belt and an air bag, for the purpose of preventing the driver from being injured in that case. There are now various types of impact absorbing mechanisms to be employed in an impact absorbing type steering column apparatus. However, ones of a double tube scheme which get collapsed simultaneously with a steering shaft when the driver suffers a secondary collision so as to absorb the impact energy thereof on that occasion are generally employed.

In an impact absorbing type steering column apparatus of this scheme, at a secondary collision of the vehicle, when an upper column on the vehicle-rear-side moves to the front side of the vehicle with respect to a lower column which is fixed to the body of the vehicle, the upper column moves to the front side of the vehicle while resisting a frictional force (sliding resistance) which is caused by a sliding contact with the lower column.

However, when this upper column moves (slides) to the front side of the vehicle, the tip end edge thereof might be twisted with respect to a sliding surface of the lower column, so that the upper column can not always slide smoothly.

For these reasons, it is disclosed in Japanese Patent Application Laid-Open No. 8-142877 that a cylindrical spacer formed of synthetic resin is press-fitted into between the lower column and the upper column, whereby the tip end edge of the upper column smoothly slides on the outer peripheral surface of the cylindrical space. With this arrangement, "the twist" of the lower column can be prevented.

In Japanese Patent Application Laid-Open No. 2002-302048, disclosed is a thin film-like friction reducing material which is formed of polymer material and coats one of the sliding surfaces of the two columns in the thickness of 10 to 100 μm, whereby the frictional resistance between the sliding surfaces of the two columns are reduced, so as to prevent "the twist" of the upper column.

However, when the cylindrical space is formed of synthetic resin and the hardness of one of the columns which serves as the outer column is low, as disclosed in Japanese Patent Application Laid-Open No. 8-142877, both the columns might be deformed and difficult to slide or scoring or the like might be caused by deformation.

Also, even when one of the sliding surfaces of the outer and inner columns is coated with a thin film-like friction reducing material formed of polymer material, as disclosed in Japanese Patent Application Laid-Open No. 2002-302048, if the hardness of the outer column or the inner column is low, the column might not be smoothly collapsed.

Note that when an end of the spacer might be provided with a flange, this flange might be caught and might not be collapsed smoothly at a secondary collision. The same might happen even if the spacer had been divided.

DISCLOSURE OF THE INVENTION

It is an object of the present invention, which was devised under such circumstances, to provide an impact absorbing type steering column apparatus for a vehicle which can get an upper column collapsed smoothly without a hitch by certainly preventing "twist" of the upper column at a secondary collision.

In order to achieve the above object, according to the present invention, there is provided an impact absorbing type steering column apparatus for a vehicle in which an upper column and a lower column are fitted to each other in such a manner that the upper column, while moving to the front part of the vehicle with respect to the lower column, absorbs the impact energy thereof, characterized in that:

a bush is fixedly fitted to at least one of the outer peripheral side of the upper column and the inner peripheral side of the lower column in the fitting part between the two columns.

Also, in the impact absorbing type steering column apparatus for a vehicle of the present invention, it is preferable that the hardness of a sliding surface of said bush is set as higher than the hardness of one of the columns which slides on the sidling surface of the bush.

Further, in the impact absorbing type steering column apparatus for a vehicle of the present invention, it is preferable that a surface roughness of the sliding surface of the bush is set as smaller than the surface roughness of the column which slides on the sidling surface of the bush.

As described above, according to the present invention, it is possible to cause the upper column to collapse smoothly without a hitch by certainly preventing "twist" of the upper column at a secondary collision by the use of the bush.

BRIEF DESCRIPTION OF THE DRAWINGS

FIG. 3A is a longitudinally sectional view of the steering column apparatus shown in FIG. 1, FIG. 3B is a view of the steering column apparatus seen along the axial direction thereof, and FIG. 3C is a front view of a bush;

EMBODIMENTS OF THE INVENTION

An impact absorbing type steering column apparatus for a vehicle according to an embodiment of the present invention will be described below with reference to the drawings.

First Embodiment

Figure 1:
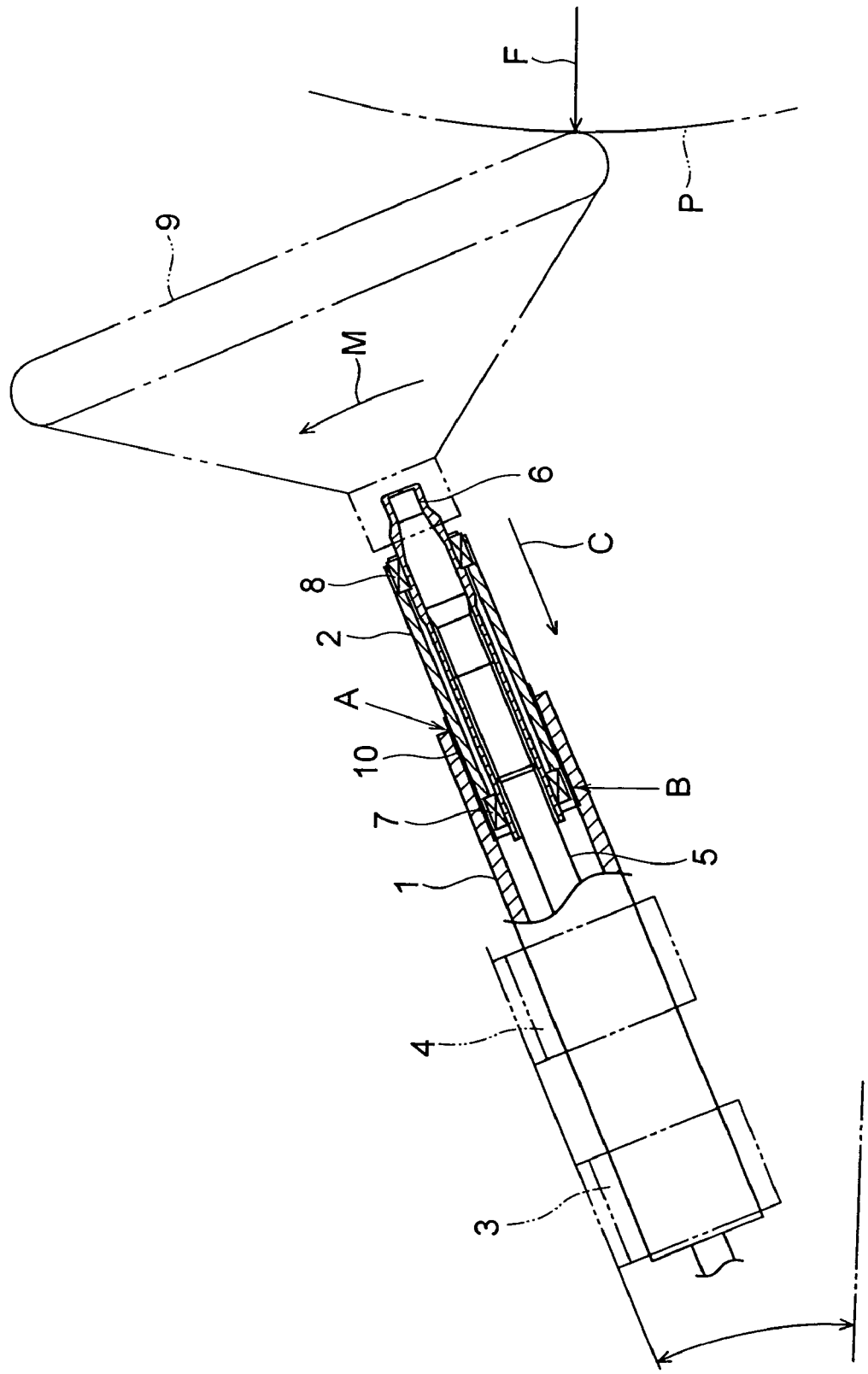
FIG. 1 is a side view showing an impact absorbing type steering column apparatus for a vehicle according to a first embodiment of the present invention, including a partially cut-away section at actual installation of the steering column apparatus in the vehicle.

FIG. 1 is a side view showing an impact absorbing type steering column apparatus for a vehicle according to the first embodiment of the present invention, containing a partially cut-away section at actual installation of the steering column apparatus in the vehicle.

Figure 2A:
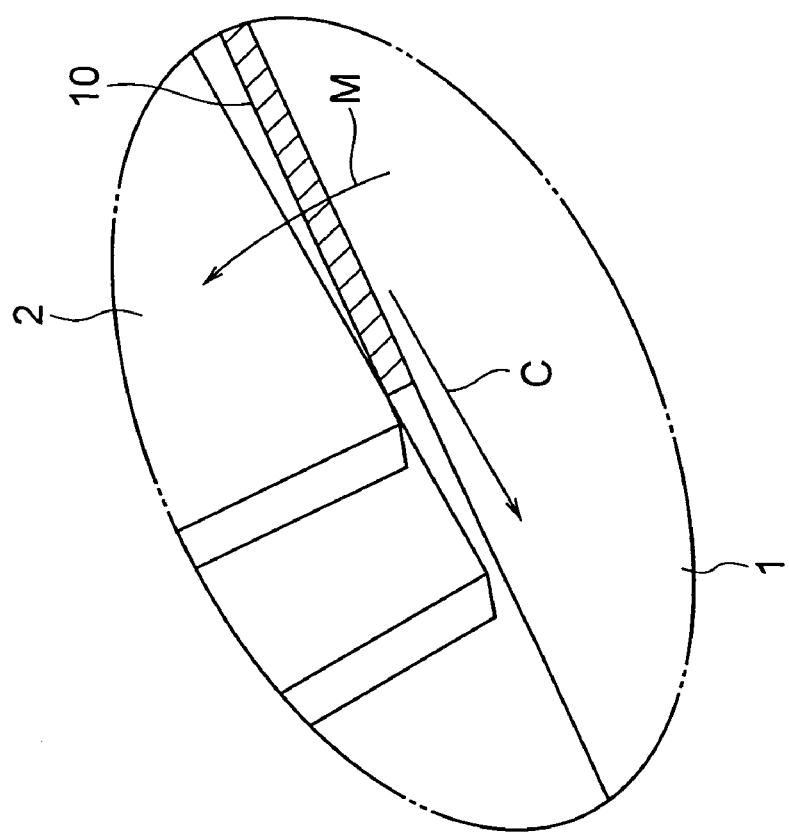
FIG. 2A is an enlarged schematic view showing a behavior of an upper column at a secondary collision according to the prior art.
Figure 2B:
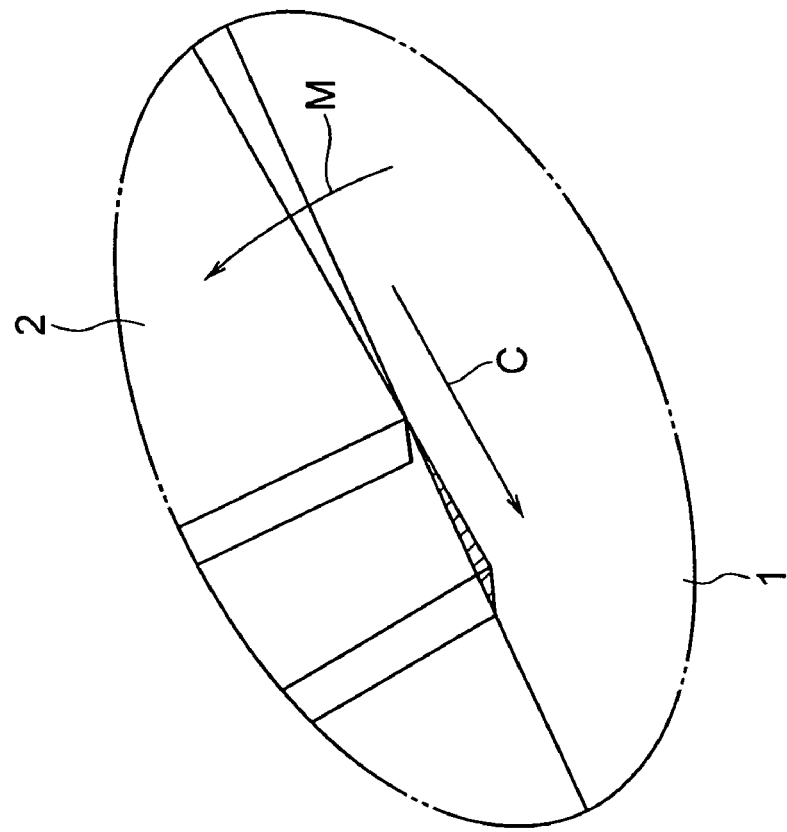
FIG. 2B is an enlarged schematic view showing a behavior of the upper column at a secondary collision according to the present invention.

FIG. 2A is an enlarged schematic view showing a behavior of an upper column at a secondary collision according to the prior art, and FIG. 2B is an enlarged schematic view showing a behavior of the upper column at a secondary collision. FIG. 3A is a longitudinally sectional view of the steering column apparatus shown in FIG. 1, FIG. 3B is a view of the steering column apparatus seen along the arrow shown in FIG. 3A, and FIG. 3C is a front view of the bush shown in FIG. 3B.

As shown in FIG. 1, a steering column is comprised of a lower column 1 which is fixed to the body of the vehicle and an upper column 2 which is fitted to this lower column 1 to be slidable at a secondary collision. In the first embodiment, the lower column 1 serves as an outer column, while the upper column 2 as an inner column. The lower column 1 is attached to the body of the vehicle by means of a lower bracket 3 and an upper bracket 4.

Inside both the columns 1 and 2, a steering shaft is supported to be rotatable. The steering shaft is comprised of a lower shaft 5 and a cylindrical upper shaft 6 which is telescopically spline-fitted to the lower shaft 5. The upper shaft 6 is supported on the upper column 2 through bearings 7 and 8 to be rotatable. A steering wheel 9 is attached to the rear end of the upper shaft 6. The lower shaft 5 is supported at the front end of the lower column 1 through unrepresented bearings to be rotatable.

In the first embodiment, a bush 10 is fixedly fitted in a fitting portion between the two columns 1 and 2 on the inner peripheral side of the lower column 1.

In the following embodiment, description is made on a case where the lower column serves as an outer column while the upper column as an inner column. However, the present invention is not limited to this. The upper column may be an outer column while the lower column may be an inner column.

A sliding surface which is the inner peripheral surface of the bush 10 is set to have high hardness and better (that is, small) surface roughness, compared with the hardness and the surface roughness of the respective materials of the lower column 1 (outer column) and the upper column 2 (inner column).

That is, the hardness of the sliding surface of the bush 10 is set as higher than the hardness of one of the columns which slides on the sliding surface of the bush 10 (in the illustrated example, the upper column 2 (inner column)). At the same time, or instead of this, the rough hardness of the sliding surface of the bush 10 is set smaller than the surface roughness of the column which slides on the sliding surface of the bush 10 (in the illustrated example, the upper column 2 (inner column)).

For example, a material of the lower column 1 serving as the outer column is aluminum (in this case, the material represents the hardness), and an aluminum die-cast surface is employed as it is as the surface of the lower column 1 (the surface processing substitutes for the surface roughness). Otherwise, a cutting work is added to the surface.

A material of the upper column 2 serving as the inner column is steel(also in this case, the material represents the hardness), a member which has been subjected to drawing may be used as it is as the surface of the upper column 2 (the surface processing substitutes for the surface roughness), or a cutting work is added.

A material of the bush 10 is SUS material (also in this case, the material represents the hardness), and for the processing of the surface thereof (substituting for the surface roughness), a member having a better (that is, smaller) surface roughness than at least the surface roughness of one of the columns which slides on the sliding surface of the bush 10 (in the illustrated first embodiment, the upper column 2 (inner column)).

Note that these materials are exemplary, and the present invention is not limited to these.

One or two bushes 10 are interposed between both the columns 1 and 2. Further, the bush 10 may be set to have the same dimension as the length of the fitting portion between the two columns 1 and 2, or may have the sufficient length for covering a point which serves as the fulcrum of the fitting portion between the two columns when a bending load is applied at a secondary collision.

Further, the fitting length between the bush 10 and the two columns may be set as smaller than the fitting length between the upper column 2 and the lower column. In this case, the thickness of the bush is arranged to be large so that an end of the upper column 2 (inner column) does not interfere with the lower column 1 (outer column) even if a bending load is applied thereon.

When the two columns 1 and 2 are formed of ferrous materials which have a small difference in hardness from the bush 10, the bush 10 may be subjected to coating of Teflon, molybdenum, or the like. It is also effective if coating is performed on the outer peripheral surface of the upper column 2 or the inner peripheral surface of the lower column 1 (outer column) in combination with the coating on the bush 10.

Further, it is possible to perform a collapsing operation smoothly by employing a bush which is formed of a material with high hardness such as stainless steel or spring steel to be interposed between the lower column 1 (outer column) of aluminum or magnesium system and the upper column 2 (inner column) of ferrous material system, thereby preventing deformation or depression of the soft lower column 1 (outer column) due to stress concentration by the use of a bending load of the upper column 2 (inner column).

From the above description, at a secondary collision, as shown in FIG. 1, when the crew P is moved to the front part of the vehicle by an impact energy (F) to collide with the steering wheel 9, the upper column 2 (inner column) is collapsed to move toward the front part of the vehicle and, at the same time, as shown in FIG. 1, a bending load (M) and a collapse load (C) are generated.

As a result, the upper column 2 (inner column) is collapsing while receiving not only the collapse load (C), but also the bending load (M).

When the bending load (M) is applied on the upper column 2 (inner column), the strongest concentrated stress is applied on positions at the front end of the upper column 2 (inner column) and the rear end of the upper column 2 (inner column), which are reversed of each other by 180 degrees in the circumferential direction. Stress concentrated portions A and B are produced on the two columns 1 and 2 due to this bending load (M). Deformation, scoring and the like are generated due to the bending load (M) and the stress concentrated portions A and B. Such deformation or scoring is produced particularly when either one of the two columns 1 and 2 is of low hardness. In this respect, particularly when the upper column starts to move, since the fitting length between two columns 1 and 2 is short, the concentrated stress is applied most strongly.

That is, as shown in FIG. 2A, when there is no bush arranged, the tip end edge (the stress concentrated portion B) of the upper column 2 which serves as the inner column might be "twisted" with respect to the inner peripheral surface (that is, the sliding surface) of the lower column 1 serving as the outer column at a start of the collapse, whereby scoring is produced as indicated by a hatching part in FIG. 2A. As a result, a smooth collapsing performance can not be obtained.

Whereas, in the first embodiment, as shown in FIG. 2B, one (or two) bush 10 which has high hardness and better (small) surface roughness is interposed between the two columns 1 and 2.

Note that the case shown in FIG. 2B is different from the first embodiment shown in FIG. 1 and FIG. 3 and is similar to the second variation of the first embodiment shown in FIG. 4B, which will be described later. FIG. 3B shows the case where the length of the bush 10 is set as small so that the front end edge of the bush 10 is positioned more backward than the front end of the upper column 2 (inner column), and the thickness of the bush is set as large so that the outer column and the inner column do not interface with each other in the course of collapse.

As a result, since the tip end of the upper column 2 slides smoothly on the inner peripheral surface (sliding surface) of the bush 10, the tip end of the upper column 2 (inner column) is not brought into contact with the inner peripheral surface of the lower column 1 (outer column) or, even if the tip end is in contact with this inner peripheral surface, there is small resistance produced from the lower column 1 so that no "twist" is produced. Thus, deformation, scoring and the like are not generated. From the above description, it is possible to securely prevent "twist" of the upper column 2 (inner column) at a secondary collision, thereby performing a collapsing operation smoothly without a hitch.

Also, as shown in FIG. 1 and FIG. 3A, there is only one bush 10 which is provided in the first embodiment, and the tip end edge of the bush 10 is extended forward from the front end of the upper column 2 (inner column). In this case, both the stress concentrated portions A and B are on the sliding surface of the bush 10 with high hardness so as to be smoothly collapsed.

Note that the bush 10 may be formed by rounding a single plate member, as shown in FIG. 3C, or may be formed to be in a cylindrical form completely closed.

(First Variation of First Embodiment)

Figure 4A:
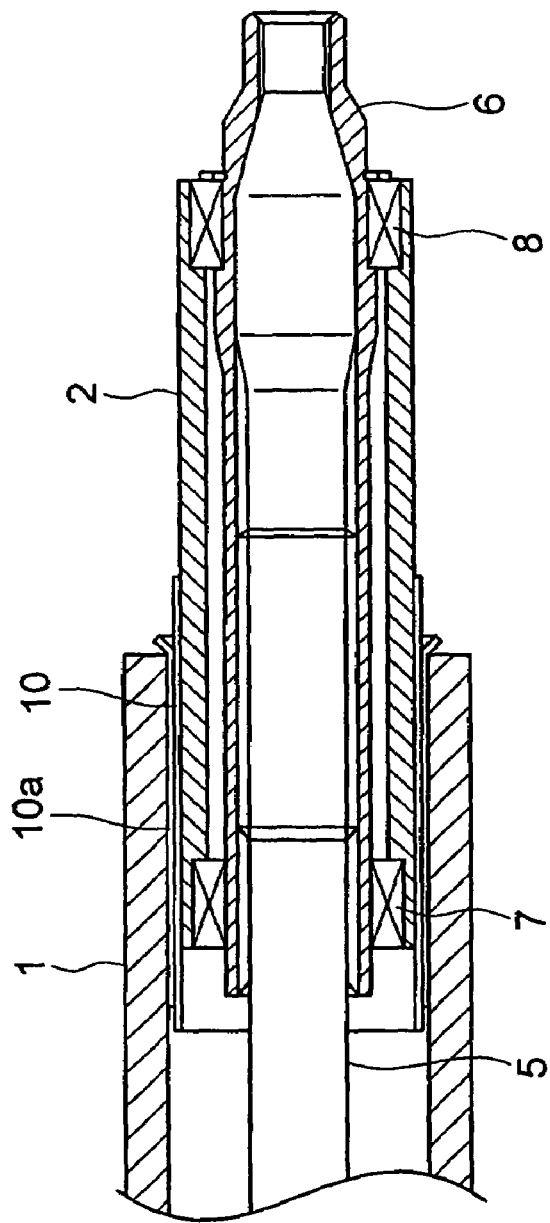
FIG. 4A is a longitudinally sectional view of an impact absorbing type steering column apparatus for a vehicle according to a first variation of the first embodiment of the present invention, and 4B is a longitudinally sectional view of an impact absorbing type steering column apparatus for a vehicle according to a second variation of the first embodiment of the present invention.

FIG. 4A is a longitudinally sectional view of an impact absorbing type steering column apparatus for a vehicle according to the first variation of the first embodiment of the present invention.

In the first variation, there are provided two bushes 10 and 10a, and the tip end edges thereof are extended forward from the tip edge of the upper column 2 (inner column). The bush 10a is fixedly fitted to the inner peripheral surface of the lower column 1 while the bush 10 is fixedly fitted to the outer peripheral surface of the upper column 2, whereby a slip can be produced between these bushes 10 and 10a at a collapse time of the upper column 2 due to the secondary collision. In the first variation shown in FIG. 4A, the tip end edge of the bush 10 is extended more forward than the tip end edge of the bush 10a, while the rear edge end of the bush 10 is extended more backward than the rear end edge of the bush 10a. The rear end edge of the bush 10a may be bent outward in the radial direction, as shown in FIG. 4A, whereby it is possible to prevent a relative shift between the bush 10a and the lower column 1 at a collapse. Though not shown in the drawings, the same effect can be obtained by bending the tip end edge of the bush 10a which is fixedly fitted to the inner column 2 inward in the radial direction.

(Second Variation of the First Embodiment)

Figure 4B:
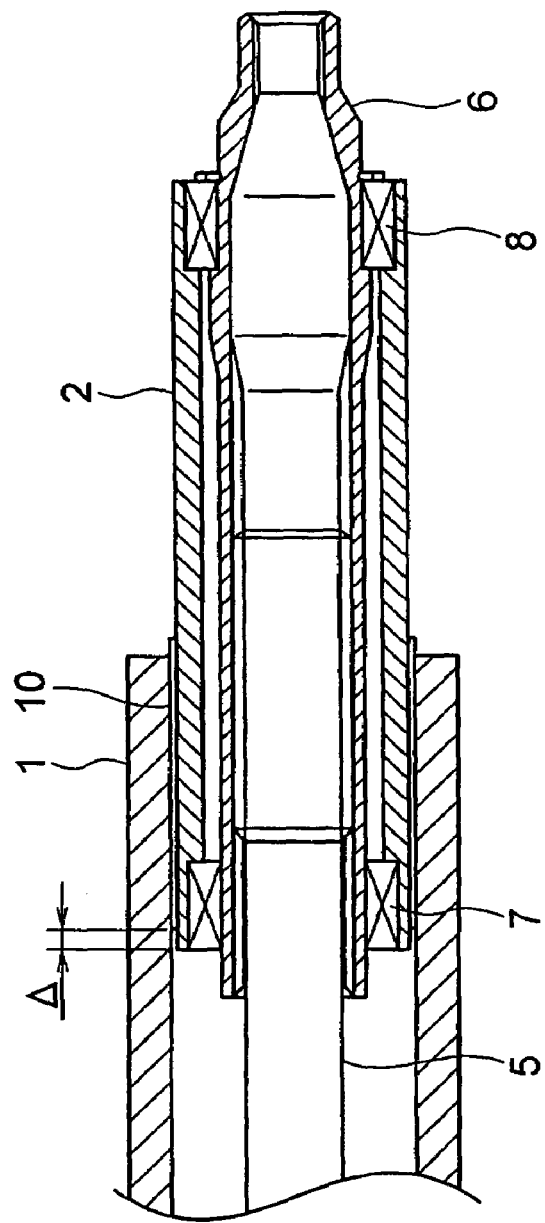

FIG. 4B is a longitudinally sectional view of an impact absorbing type steering column apparatus for a vehicle according to the second variation of the first embodiment of the present invention.

In the second variation, there is provided only one bush 10 and is set as short so that the tip end edge thereof is positioned more backward than the tip end edge of the upper column 2 (inner column) by a predetermined distance (Δ). In this case, it is arranged such that an end of the upper column 2 (inner column) does not interfere with the lower column 1 (outer column) even when the bending load (M) is applied thereon by increasing the thickness of the bush.

Also, in this case, as shown in FIG. 2B, at a secondary collision, since sliding on the inner peripheral surface (sliding surface) of the bush 10 smoothly, the tip end edge of the upper column 2 (inner column) is not brought into contact with the inner peripheral surface of the lower column 1 (outer column). As a result, there is no "twist" produced, and deformation, scoring occur and the like are not generated. Therefore, it is possible to perform a collapsing operation smoothly without a hitch by securely preventing "twist" of the upper column 2 (inner column) at a secondary collision. Other arrangements, effects, etc., are the same as those in the foregoing first embodiment.

Second Embodiment: Tilt Type

Figure 5:
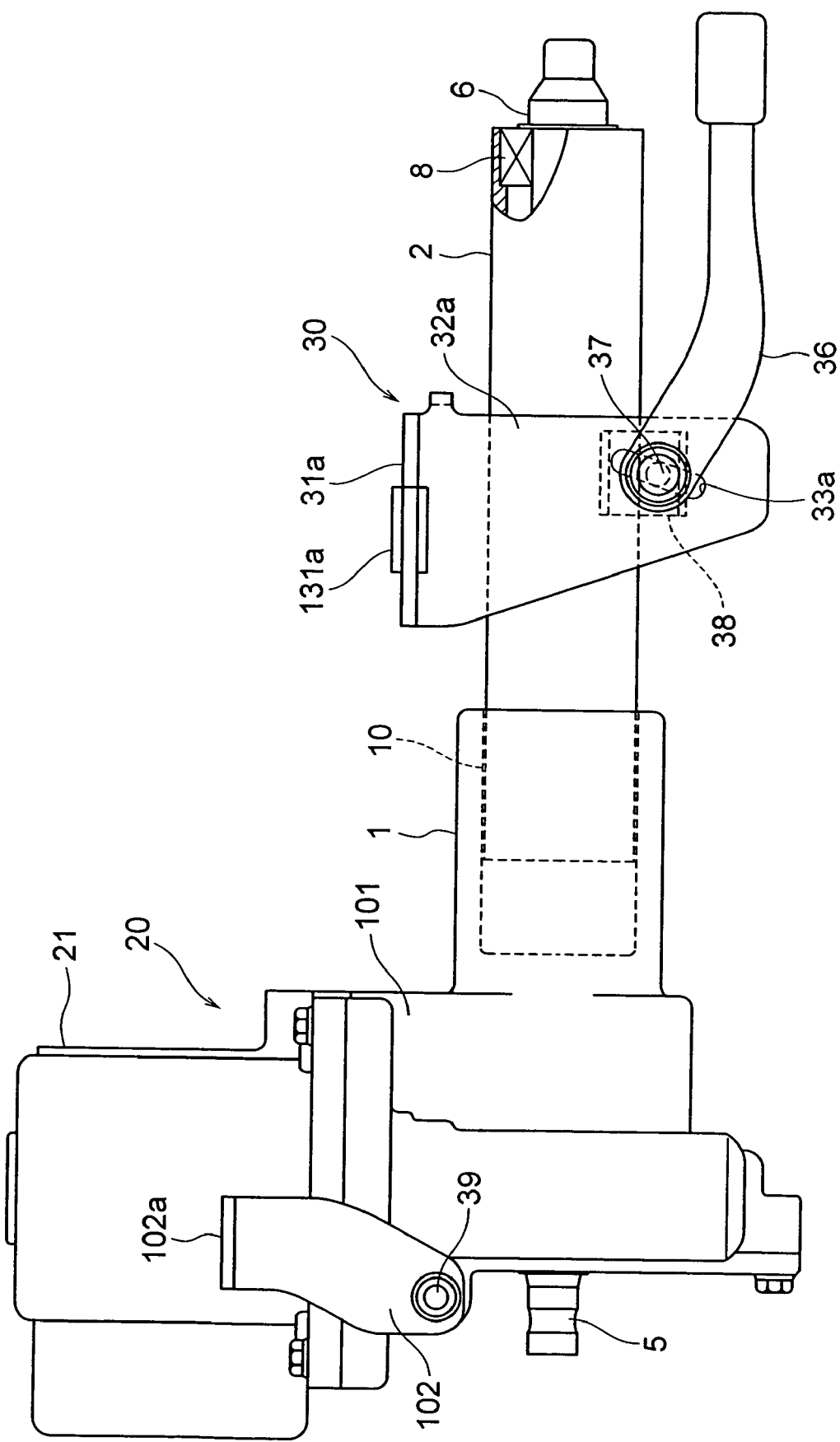
FIG. 5 is a side view showing an impact absorbing type steering column apparatus for a vehicle according to a second embodiment of the present invention.

FIG. 5 is a side view showing an impact absorbing type steering column apparatus for a vehicle according to the second embodiment of the present invention.

Figure 6:
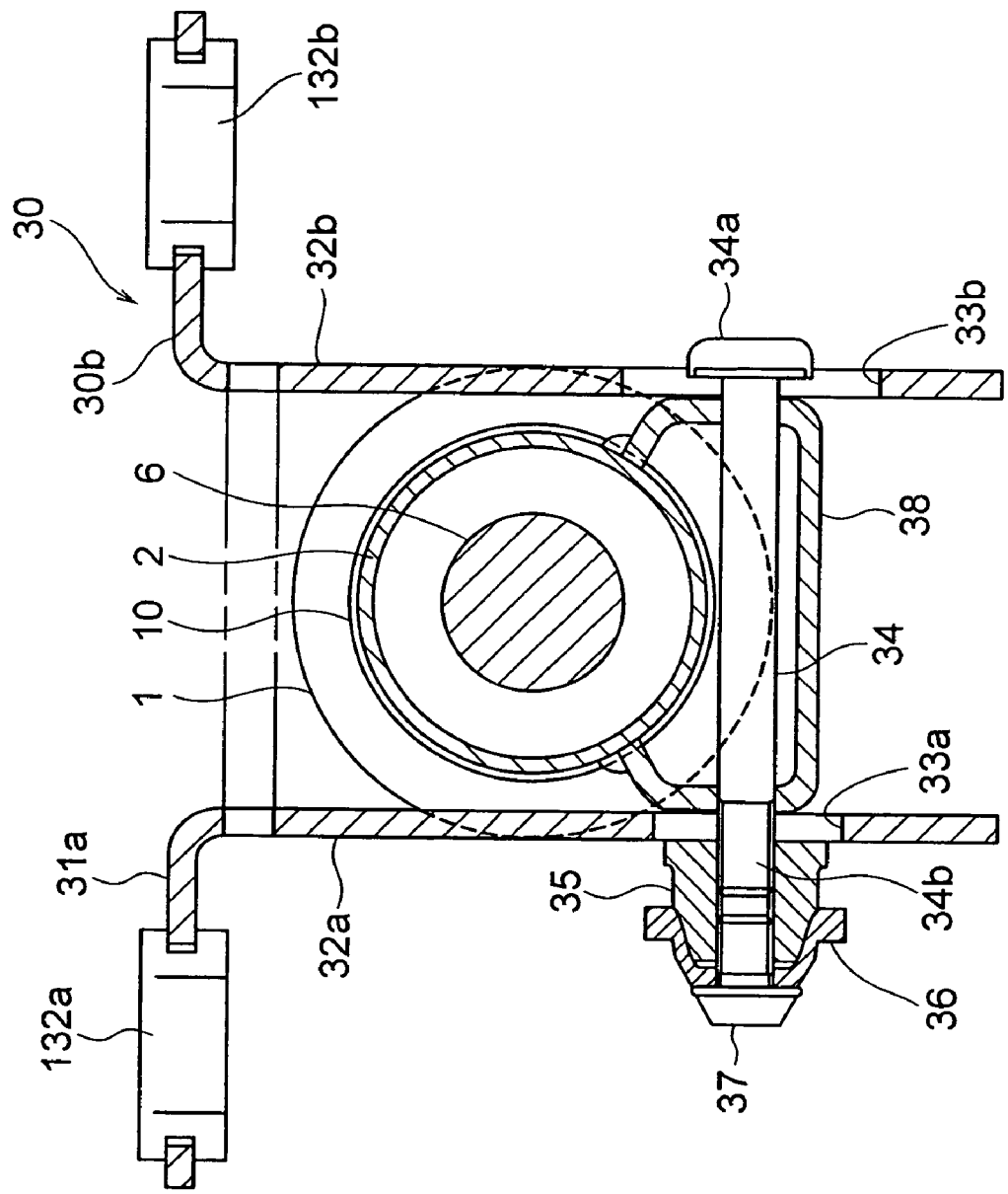
FIG. 6 is a transverse sectional view of the impact absorbing type steering column apparatus shown in FIG. 5.

FIG. 6 is a laterally sectional view of the impact absorbing type steering column apparatus shown in FIG. 5.

In the second embodiment, there is provided an electric power steering apparatus 20. In the electric power steering apparatus 20, since an on-board battery is used as a power source of an electric motor 21, a direct drive loss of an engine is not generated. Since the electric motor 21 is started only at the time of steering assist, reduction of fuel efficiency of the vehicle (a drive loss of the engine related to an alternator) can be prevented. Other similar characteristics on which electron control can be easily effected are provided with the electric power steering apparatus 20.

The electric power steering apparatus is fixed to a rotation transmitting mechanism housing 101 which is integrally formed with the lower column 1 as the outer column. An upper part at the front end of this housing 101 is supported by a pair of vehicle-side lower brackets 102 which are provided on the both sides seen from the left in FIG. 5, to be rotatable around pivots 39. The vehicle body-side lower brackets 102 are mounted on a vehicle body-side reinforcing member by means of a vehicle-body mounting member 102a which is extended horizontally in FIG. 5. Since the rotation transmitting mechanism itself for transmitting rotation from the electric motor 21 of the electric power steering apparatus 20 to the lower shaft 5 is not directly related to the present invention, description thereof is omitted here. However a generally known mechanism may be used as this transmitting mechanism.

In the second embodiment, the upper column 2 is formed as the inner column, and is fitted to the lower column 1 as the outer column along a predetermined length at the front end portion. In the fitting portion, the bush 10 is fixedly fitted on the inner peripheral surface of the lower column 1 as the outer column. The structure and function of the upper column 2, the bush 10 and the lower column 1 are the same as those in the first embodiment.

Also in the second embodiment, there is provided a tilting type clamping mechanism, and a vehicle body-side upper bracket 30 is provided with a pair of vehicle-body mounting members 31a, 31b which are extended horizontally in the drawing. The vehicle-body mounting members 31a, 31b are mounted on the a vehicle body-side reinforcing member (not shown) through capsules 132a, 132b by means of a bolt (not shown), or the like. At a secondary collision, the upper column 2 and the upper bracket 30 are released from the capsules 131a, 131b to move toward the front side of the vehicle due to an impact load. These paired vehicle-body mounting members 31a, 31b are integrally formed with a pair of right and left flat plate portions 32a, 32b which opposite to each other and are extended substantially in a vertical direction.

In the clamping mechanism, a clamping bolt 34 is inserted into a pair of tilt elongated holes 33a, 33b which are formed on the opposite flat plate portions 32a, 32b. This clamping bolt 34 is engaged with the tilt elongated hole 33b at a part of a head 34a thereof, so as to be unrotational at all times and to be slidable inside the tilt elongated holes 33a, 33b.

A nut 35 is engaged with a threaded portion 34b of the clamping bolt 34. An operational lever 36 is fixed to this nut 35 by means of a mounting bolt 37.

Accordingly, when a tilt adjustment is performed, if the operational lever 36 is rotated in one direction, the nut 35 is rotated to release the clamping by the clamping bolt 34, whereby a space between the paired opposite flat plate portions 32a, 32b is extended and the pressure contact between the opposite flat plate portions 32a, 32b and a distance bracket 38 is released. Thereupon, the upper column 2 is rotated around the tilting center 39, together with the lower column 1 and the like, whereby the tilt adjustment can be performed.

On the other hand, when a clamping is effected at a tilt adjustment position, the operational lever 36 is rotated in a reverse direction, so that the tilt nut 35 is also rotated in the reverse direction. Thus, the clamping bolt 34 is clamped and the space between the paired opposite flat plate portions 32a, 32b is narrowed, so that the opposite flat plate portions 32a, 32b are urged against the distance bracket 38.

Third Embodiment: Tilt/Telescopic Type

Figure 7:
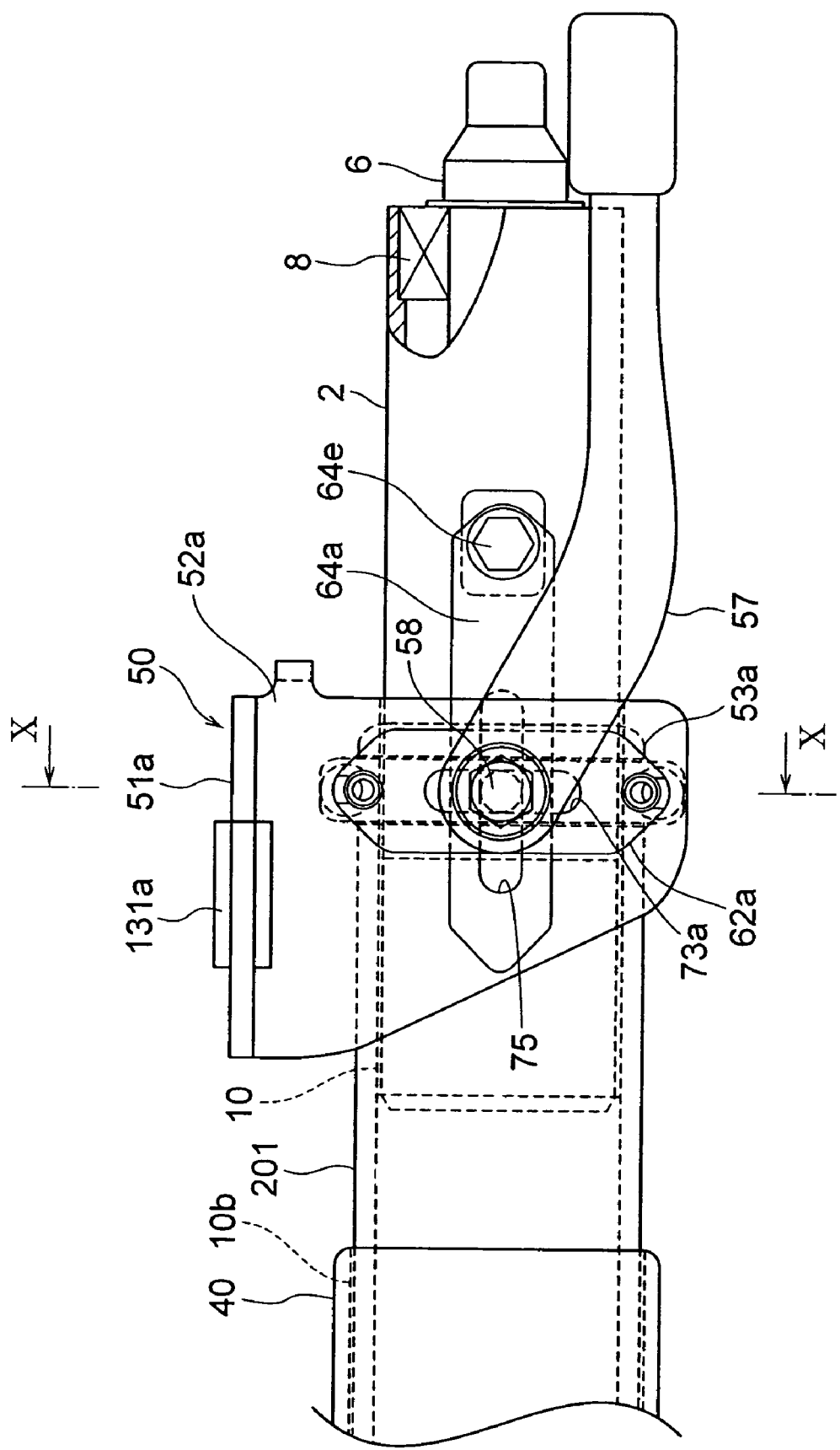
FIG. 7 is a side view showing an impact absorbing type steering column apparatus for a vehicle according to a third embodiment of the present invention.

FIG. 7 is a side view showing an impact absorbing type steering column apparatus for a vehicle according to the third embodiment of the present invention.

Figure 8:
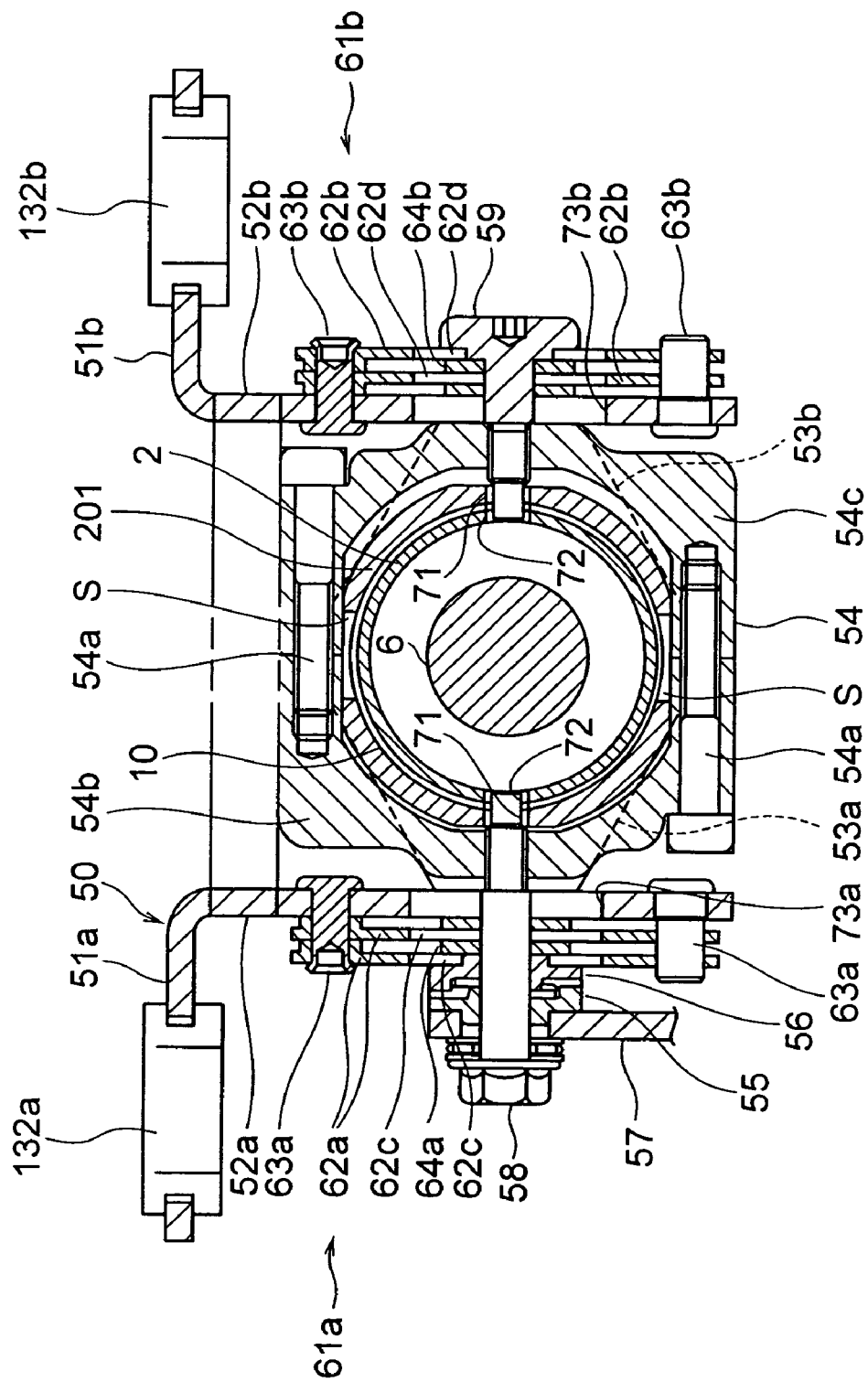
FIG. 8 is a transverse sectional view of the impact absorbing type steering column apparatus shown in FIG. 7.

FIG. 8 is a sectional view of the impact absorbing type steering column apparatus shown in FIG. 7, taken along the line X-X.

The third embodiment shows a steering column of a double-collapse type, in which the steering column apparatus is comprised of the upper column 2, an intermediate column 201 which is fitted on the front end of the upper column 2, and a lower column 40 which is fitted on the front end of the intermediate column 201 and is fixed to the body of the vehicle at a lower part of the front end.

The structures of the intermediate column 201 and the upper column 2 in the fitting portion are the same as those of the lower column 1 and the upper column 2 in the fitting portion in the second embodiment shown in FIG. 5. The bush 10 is fixedly fitted on the inner peripheral surface of the intermediate column 201 in a front part of the fitting portion between the intermediate column 201 and the upper column 2, that is, in a portion in a predetermined length at the front end of the upper column 2.

On the other hand, the front end of the intermediate column 201 is fitted in a rear end of the lower column 40 along a predetermined length. In these fitting portions, the bush 10b is fixedly fitted on the inner peripheral surface of the lower column 40 which serves as the outer column. The structure of these fitting portions including the bush 10b and the structure between the lower column 40 and the body of the vehicle and the function thereof are the same as the structure between the lower column 1 and the upper column 2 through the bush 10 and the structure between the lower column 1 and the body of the vehicle and the function thereof shown in FIG. 5.

The steering column apparatus of the third embodiment is provided with a clamping mechanism of a tilt/telescopic scheme, and a vehicle body-side upper bracket 50 is provided with a pair of vehicle-body mounting members 51a, 51b with the upper column 2 therebetween, on the side of the vehicle more forward than an intermediate portion in the longitudinal direction of the upper column 2. Parts extended downward from these paired vehicle-body mounting members 51a, 51b are provided with a pair of right and left flat plate portions which are opposite to each other and are extended substantially in a vertical direction. The vehicle-body mounting members 51a, 51b are secured on the vehicle body-side reinforcing member respectively through capsules 132a, 132b by means of fixing means such as a bolt (not shown).

Further, the intermediate column 201 is integrally provided, in the rear part of the vehicle, with clamp portions 53a, 53b with a predetermined distance in the axial direction therebetween, which are extended toward the opposite flat plate portions 52a, 52b and which are respectively brought into engagement contact with said opposite flat plate portions 52a, 52b. (In FIG. 8, out of two pairs of clamp portions 53a, 53b, only the clamp portions 53a, 53b in the front part of the vehicle are illustrated). Over a length portion of the intermediate column 201 on which these clamp portions 53a, 53b are formed, there are provided upper and lower slits S, S which are extended in the axial direction.

With this arrangement, when a space between the paired opposite flat plate portions 52a, 52b of the vehicle body-side upper bracket 50 is reduced and the clamp portions 53a, 53b are pressed toward each other, the intermediate column 201 is contracted in diameter at the portions of the clamp portions 53a, 53b so as to clamp the upper column 2.

A substantially annular tension member 54 which surrounds the upper column 2 with a gap in the radial direction is provided in a space between the two pairs of the clamp portions 53a, 53b in the axial direction. The tension member 54 is composed of two half bodies 54b, 54c which are clamped and fixed to each other by upper and lower two nuts 54a.

An adjusting bolt 58 is thread-engaged with one of the half bodies 54b of the tension member 54 through a cam mechanism which consists of a pair of cam members 55 and 56 and an adjusting bolt 58 and through the operational lever 57.

The cam mechanism is comprised of a first cam member 55 which rotates together with the operational lever 57 and has a convex part and a concave part, and a second cam member 56 which is unrotational and has a convex part and a concave part to be engaged with the convex part and the concave part of the first cam member 55.

An adjusting bolt 59 is thread-engaged with the other half body 54c of the tension member 54. The tip ends of the two adjusting bolts 58 and 59 are respectively engaged with elongated holes 71 and 72 for telescopic adjustment, which are respectively formed on both the columns 1 and 2. Intermediate large-diameter portions of the two adjusting bolts 58 and 59 are respectively inserted into the elongated holes 73a, 73b for tilt adjustment formed on the opposite flat plate portions 52a, 52b.

Further, a pair of multi-plate type frictional engagement mechanisms 61a, 61b are employed in this steering column apparatus. That is, two sets each including two frictional plates 62a, 62a; 62b, 62b which are extended in a direction in which the tilt elongated holes 73a, 73b are extended are secured to the outer side surfaces of the paired opposite flat plate portions 52a, 52b by means of two sets each including upper and lower rivets 63a, 63a; 63b, 63b. Tilt elongated holes 62c, 62c; 62d, 62d are formed on the frictional plates 62a, 62a; 62b, 62b, respectively. The adjusting bolts 58 and 59 are inserted through these tilt elongated holes 62c, 62c; 62d, 62d, respectively. Frictional plates 64a, 64b are interposed between these frictional plates 62a, 62a; 62b, 62b and between the frictional plates 62a, 62b and the opposite flat plate portions 52a, 52b to be extended in the axial direction. Telescopic position adjusting elongated holes 75 (only the elongated hole 75 of the frictional plate 64a is illustrated in FIG. 7) which are extended in the axial direction are formed on the frictional plate 64a, 64b. The frictional plates 64a, 64b are mounted on the outer column 2 by bolts 64e (see FIG. 7).

With such an arrangement, in order to perform tilt/telescopic adjustment, the driver first rotates the operational lever 57 clockwise. Then, the first cam member 55 engaged with the operational lever 57 is rotated relatively to the second cam member 56, whereby the width of the cam mechanism is reduced.

With the above operation, a pressure contact force between the frictional plate 62a and the frictional plate 64a in the multi-plate frictional engagement mechanism 61a becomes extinct. A pressure contact force between the frictional plate 62b and the frictional plate 64b in the other multi-plate frictional engagement mechanism 61b also becomes extinct through the tension member 54. As a result, the columns 2, 201 and 40 become capable of tilting movement.

When the width of the cam mechanism is reduced, the tension acting between the paired opposite flat plate portions 52a, 52b through the tension member 54 becomes extinct, whereby a pressing force of the inner side surfaces of the paired opposite flat plate portions 52a, 52b against the clamp portions 53a, 53b becomes extinct.

Thereupon, the size of a part with the rear slits S of the intermediate column 201 formed therein is increased in diameter by the elasticity thereof, so that a tight clamping force with respect to the upper column 2 is lost. As a result, the upper column 2 is enabled to move telescopically.

The driver, when completing positional adjustment of the steering wheel by effecting tilting or telescopic adjustment, rotates the operational lever 57 counter-clockwise. Thus, the width of the cam mechanism is increased, so the pressure contact force between the frictional plates 62a, 62a; 62b, 62b and the frictional plates 64a; 64b is generated through the tension member 54, whereby the two columns 1 and 2 are fixed in the tilting direction by means of the multi-plate frictional engagement mechanisms 61a, 61b.

Simultaneously, the width of the paired opposite flat plate portions 52a, 52b is reduced through the tension member 54 so that, when the clamp portions 53a, 53b are pressed, the lower column 1 is contracted in diameter. Thereupon, the upper column 2 is clamped by the contracted intermediate column 201, to be fixed in the telescopic direction.

At a secondary collision, the upper column 2 slides with respect to the intermediate column 201 to be collapsed. When the upper column 2 reaches the collapse end, the capsules 132a, 132b and the vehicle body-side upper bracket 50 are removed from the vehicle body-side reinforcing member. Subsequently, a part between the intermediate column 201 and the lower column 50 starts to collapse.

At a secondary collision, the collapsing order is not limited to that described above. For example, it may be arranged such that the capsules 132a, 132b and the vehicle body-side upper bracket 50 are first removed from the vehicle body-side reinforcing member, then a part between the intermediate column 201 and the lower column 40 is collapsed, and finally the part between the intermediate column 201 and the upper column 2 is collapsed. Or, it may be arranged such that either two of these collapses happen simultaneously.

Note that the present invention is not limited to the embodiments described above, but may be changed in various manners. For example, an impact absorbing type steering apparatus for a vehicle according to the present invention can be applied to either of a non-tilting scheme, a non-telescopic scheme, a tilting scheme, a telescopic scheme, and a tilt/telescopic scheme.

As described above, according to the embodiments described above, the hardness of the sliding surface of the bush is set higher than the hardness of one of the columns which slides on the sliding surface of the bush. At the same time, or instead of this, the surface roughness of the sliding surface of the bush is set smaller than the surface roughness of the column which slides on the sliding surface of the bush. As a result, it is possible to securely prevent a "twist" of the upper column at a secondary collision, so as to collapse the upper column smoothly and without a hitch.

The invention claimed is:

1. An impact absorbing steering column apparatus for a vehicle which comprises two columns having a fitting portion therebetween and in which one of the columns nearer to a steering wheel is moved with respect to the other upon a secondary collision of the vehicle so as to absorb an impact energy, characterized in that:

a cylindrical bush is fixedly fitted to one of peripheral surfaces of the two columns which face one another in a radial direction and form said fitting portion between the two columns, the bush being in direct contact with the other of said peripheral surfaces of the columns and relatively sliding thereon upon secondary collision; and a hardness of a surface of said bush that is in contact with said other of said peripheral surfaces of the columns and slides thereon, is set as higher than a hardness of said other of said peripheral surfaces of the columns.

2. An impact absorbing steering column apparatus for a vehicle which comprises two columns having a fitting portion therebetween and in which one of the columns nearer to a steering wheel is moved with respect to the other upon a secondary collision of the vehicle so as to absorb an impact energy, characterized in that:

a cylindrical bush is fixedly fitted to one of peripheral surfaces of the two columns which face one another in a radial direction and form said fitting portion between the two columns, the bush being in direct contact with the other of said peripheral surfaces and relatively sliding thereon upon secondary collision; and a surface roughness of a surface of the bush that is in contact with said other of said peripheral surfaces of the columns and slides thereon, is set as smaller than a surface roughness of said other of said peripheral surfaces of the columns.

3. An impact absorbing steering column apparatus for a vehicle according to claim 1 or 2, wherein said one of the columns is an inner column while the other is a column to be fitted on the said one column and has an inner peripheral surface with a diameter larger than that of said one column.

4. An impact absorbing steering column apparatus for a vehicle according to claim 3, wherein said one of the columns has a steering wheel connecting portion while said other of the columns is fixed to a vehicle body-side reinforcing member to be unmovable.

5. An impact absorbing steering column apparatus for a vehicle according to claim 4, wherein said bush is fixedly fitted on the inner peripheral surface of said other of the columns.

6. An impact absorbing steering column apparatus for a vehicle according to claim 3, further comprising:
a third column which is fitted on an end portion on a vehicle-front side of said other of the columns and has an inner peripheral surface with a diameter larger than that of said other of the columns,
wherein a second bush is fixedly fitted on at least one of said other column and said third column in a fitting portion between said other column and said third column.

7. An impact absorbing steering column apparatus for a vehicle according to claim 6, wherein a vehicle-rear end of said one column has a steering wheel connecting portion; and
said third column is fixed to a vehicle body-side reinforcing member to be unmovable.

8. An impact absorbing steering column apparatus for a vehicle according to claim 1, wherein said other of the columns is changeable in diameter so that an axial position of the inner column may be adjusted.

* * * * *